United States Patent [19]

Kotthaus

[11] Patent Number: 4,611,956
[45] Date of Patent: Sep. 16, 1986

[54] METHOD FOR FABRICATING BEVEL AND HYPOID GEAR PAIRS

[75] Inventor: Erich Kotthaus, Wallisellen, Switzerland

[73] Assignee: Werkzeugmaschinenfabrik Oerlikon-Bührle AG, Zürich, Switzerland

[21] Appl. No.: 641,387

[22] Filed: Aug. 16, 1984

Related U.S. Application Data

[63] Continuation-in-part of Ser. No. 449,422, Dec. 13, 1982, abandoned, which is a continuation of Ser. No. 170,759, Jul. 21, 1980, abandoned.

[30] Foreign Application Priority Data

Aug. 16, 1979 [CH] Switzerland ............. 7498/79

[51] Int. Cl.⁴ ................................. B23F 9/10
[52] U.S. Cl. ........................ 409/26; 409/30; 409/51; 409/53
[58] Field of Search ................ 409/26–30, 409/51–53

[56] References Cited

U.S. PATENT DOCUMENTS 3,218,931  11/1965  Kotthaus ................. 409/26
4,211,511  7/1980   Kotthaus ................. 409/26

Primary Examiner—Gil Weidenfeld
Assistant Examiner—Steven C. Bishop
Attorney, Agent, or Firm—Werner W. Kleeman

[57] ABSTRACT

A method of manufacturing bevel and hypoid gear pairs according to an imaginary mating gear cutting process. The tooth spaces are cut by means of a face-mill cutter head rotating about an axis of rotation. In order to overcome heretofore prevailing limitations on the gear diameter, cone angle and shaft angle of gear pairs, either the gear or the cutter head performs an arcuate generating movement about a generating axis in order to produce one of the gears, whereby a machining axis is adjusted relative to the generating axis in accordance with the position of the axes of both gears of the gear pair. In one advantageous embodiment, the same machining axis adjustment is also employed for fabricating the mating, non-generated gear.

9 Claims, 4 Drawing Figures

METHOD FOR FABRICATING BEVEL AND HYPOID GEAR PAIRS

CROSS-REFERENCE TO RELATED APPLICATIONS

This application is a continuation-in-part application of my commonly assigned, copending U.S. application Ser. No. 449,422, filed Dec. 13, 1982, now abandoned, which, in turn, is a continuation of my commonly assigned U.S. application Ser. No. 170,759, filed July 21, 1980, now abandoned. This application is related to my commonly assigned U.S. Pat. No. 4,183,703, granted Jan. 15, 1980, and the divisional applications Ser. No. 796,401, filed May 12, 1977, now U.S. Pat. No. 4,211,511, granted July 8, 1980 and Ser. No. 957,985, filed Nov. 6, 1978, now U.S. Pat. No. 4,224,834, granted Sept. 30, 1980. This application is also related to my commonly assigned, copending application Ser. No. 06/170,532, filed July 21, 1980, entitled "Method For Fabricating Gears With Generated Tooth Flanks And Apparatus For Use With A Gear Cutting Machine For Performance Of The Aforesaid Method", now U.S. Pat. No. 4,353,671, granted Oct. 12, 1982.

BACKGROUND OF THE INVENTION

The present invention relates to a new and improved method of fabricating bevel and hypoid gear pairs by cutting out tooth spaces or gaps by means of an end or face-mill cutter head rotating about an axis of rotation while working in accordance with the imaginary mating gear method.

There are already known to the art methods of manufacturing gear pairs in accordance with the foregoing. With such heretofore known methods, for instance for fabricating one of the gears, the axis of the one gear is adjusted such that it meshes with an imaginary mating gear, also known as a generating gear or an imaginary generating gear, whose axis is concentric with a generating axis. The rotational axis of the end or face-mill cutter head is set perpendicular to a generatrix of a pitch surface of the gear, the generatrix confronting the end or face-mill cutter head. By rotating the end or face-mill cutter head about the axis of rotation there are thus cut-out the tooth spaces or gaps. In order to generate the tooth flanks, the axis of rotation of the face-mill cutter head performs an arcuate movement about the generating axis.

To produce the other gear or mating gear, the axis of the mating gear is positioned coaxially with respect to the generating axis. The axis of rotation of the face-mill cutter head is likewise adjusted perpendicular to a generatrix of the pitch surface of such mating gear. There is not required any subsequent generating of the tooth flanks.

In order to produce both gears, for instance a pair of bevel gears, the axis of rotation of the face-mill cutter head, in both instances, must be disposed perpendicular to a generatrix of the pitch cone of one gear. This means that the angle between the rotational axis and the generating axis is dependent upon the cone angle of the one gear. Since with state-of-the-art gear cutting machines for producing bevel gears the axis of rotation of the face-mill cutter head can only be tilted through a limited angle of inclination out of a parallel position towards the generating axis, the range of possible cone angles for the one gear of the bevel gear pair is limited, and specifically such that this limitation precludes small cone angles.

It is also known to fabricate only the one gear to be generated of a bevel or hypoid gear pair according to the imaginary mating gear method and to fabricate the mating gear of such gear pair by other, plunge-cut methods, e.g. by the imaginary crown gear method.

It is not possible or is only possible under extremely limited conditions to fabricate that gear of a gear pair which must be produced by generation in pairs of bevel gears with small shaft angles upon prior art machines according to the heretofore known imaginary mating gear method, because both of the gears of the bevel gear pair have small cone angles or angle of opening. The permissible operating range for known machines is well defined, e.g. it is defined for gear ratios as being not smaller than approximately 2.5:1 or it is defined for shaft angles as being about 65° to 180°. In other words, the cone angle or pitch angle of the imaginary mating gear may not be less than 90° minus the maximum tilt angle of the cutter head spindle in the generating drum, which is about 30° to 40°. This means that gear transmissions or gear pairs having a cone angle below about 60° cannot be fabricated in practice by the imaginary mating gear method.

Such gears which could not be produced according to the heretofore known imaginary mating gear methods, frequently could be fabricated according to the known imaginary crown gear method. Here, the axis either of the gear to be fabricated or of the mating gear is positioned such that in either case a generatrix of the pitch surface of the gear is disposed perpendicular to the generating axis and to the rotational axis which is parallel thereto, and thus, is located parallel to the end surface of the face-mill cutter head. Moreover, the generating axis intersects the center of an imaginary crown gear which extends parallel to the aforementioned generatrix. With this technique the teeth of the gear and the mating gear must be generated. This occurs in that the axis of rotation of the face-mill cutter head is rocked about the generating axis.

If in accordance with this method there can be manufactured gear pairs having random shaft angles or cone angles, then the diameter of the gears with small cone angles is extremely limited by the existing machines. This is so with regard to bevel gears because the center of the cone is located upon the generating axis and the height of the cone or the diameter of the generating crown gear depends upon the lateral spacing of the generating axis to the point of attack of the face-mill cutter head. With a given cone angle the diameter of the bevel gear is governed by this limited lateral spacing.

In particular, in Swiss Patent No. 594,468 there is taught an imaginary mating gear method for fabricating a pair of spur gears. With this method one of the elements, either the spur gear or the face-mill cutter head, performs an arc-shaped generating movement about a generating axis in order to fabricate the one spur gear, this generating movement coinciding with the gear axis of the mating gear. The mating gear is produced without any generating movement by a plunge cut method.

Hence, with this method there only can be fabricated spur gears, and specifically only spur gears whose axes or shafts extend parallel to one another. Significant in this regard are U.S. Pat. No. 4,183,703, granted Jan. 15, 1980 and U.S. Pat. No. 4,211,511, granted July 8, 1980.

SUMMARY OF THE INVENTION

Therefore, with the foregoing in mind, it is a primary object of the present invention to provide a new and improved method of fabricating bevel and hypoid gear pairs, wherein limitations as to the gear diameter, cone angle and shaft angle of the gear pairs, which existed with the heretofore known gear cutting methods using known equipment, are eliminated.

The advantages which can be realized with the practice of the invention reside in the fact that it is now possible to produce gears upon existing machines which heretofore could not or could only to a limited degree be fabricated upon such machinery, i.e. there can now be produced a wide variety of gears according to the imaginary mating gear method. The therewith attendant advantages, such as increased economy, tooth contact along a line instead of at a migrating point, impart a greater utility to the pairs of gears.

Now in order to implement the aforementioned object and others which will become more readily apparent as the description proceeds, the method of the present development for manufacturing gears of the character described, is manifested by the features that for the fabrication of the one gear, either such one gear or the face-mill cutter head carries out an arcuate-shaped generating movement about a generating axis and a machining axis is adjusted relative to the generating axis in accordance with the position of the axes of both gears of the gear pair with respect to one another. In one advantageous embodiment the same machining axis adjustment is also employed for fabricating the non-generated mating gear.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
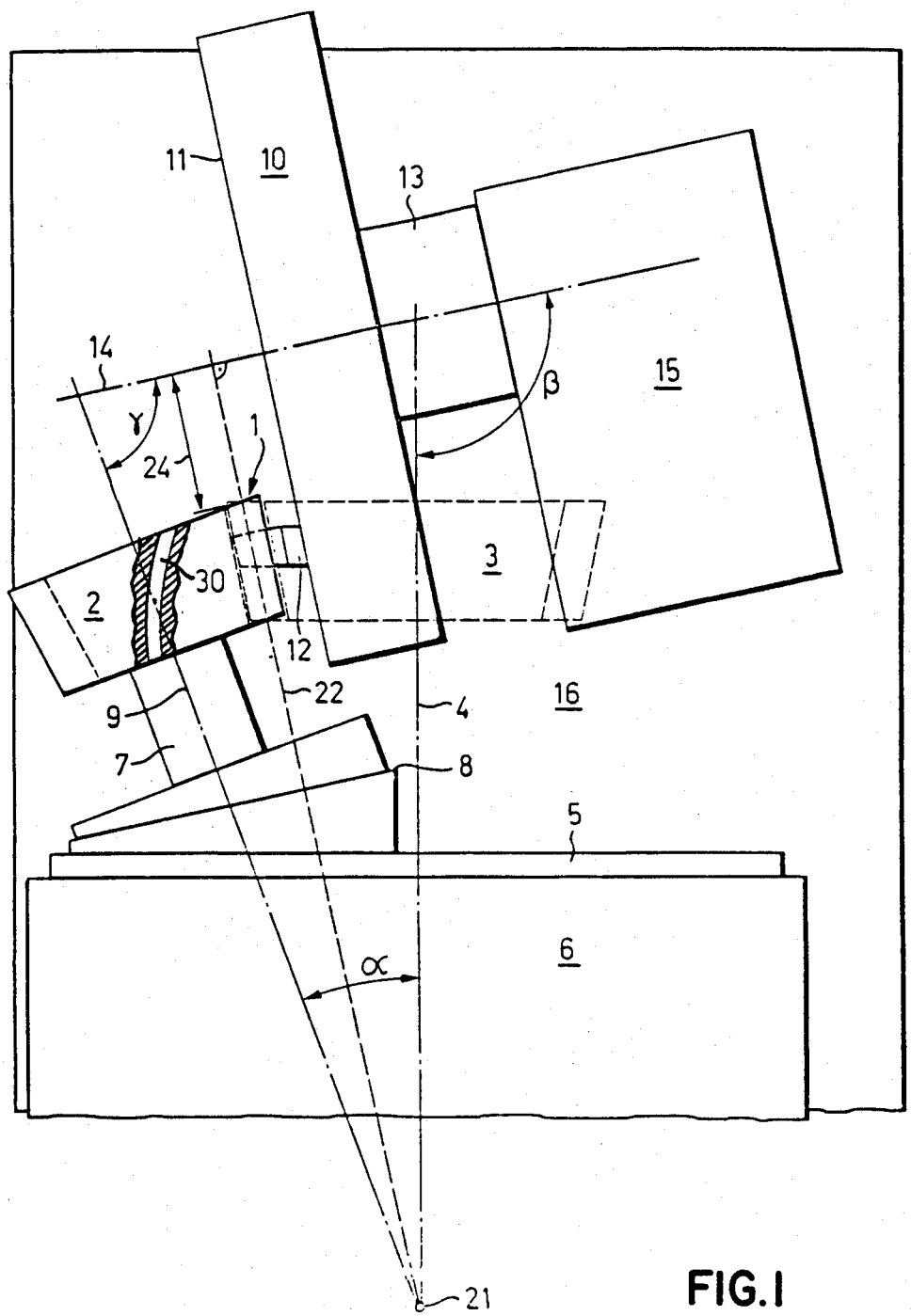
FIG. 1 schematically illustrates an arrangement for fabricating one of the gears of a pair of bevel or hypoid gears.

Describing now the drawings, in FIG. 1 there will be seen a pair of gears 1 consisting of a gear 2 which is just in the process of being produced and a mating gear 3, which in this case has been shown in broken lines because it is only imaginary, in other words it is not actually arranged at a generating axis 4. The not further illustrated pitch surfaces of the gear 2 and the mating gear 3 contact at a common generatrix 22. Rotatable about the generating axis 4 is a generating or roll drum 5 which is mounted within a generating or roll cradle 6.

The gear 2 which is to be fabricated is connected by means of a first spindle 7 and a pivotable part or component 8 with the generating or roll drum 5. A machining axis 9, about which the gear 2 is rotatable upon the first spindle 7, is adjustable as concerns its angle of inclination α, which is shown here as an acute angle, with respect to the generating axis 4 by means of the pivotable part 8.

An end or face-mill cutter head 10, from whose end surface 11 there protrude a number of cutters or cutter blades 12, wherein only one has been illustrated, is secured to a second spindle 13. This second spindle 13 is rotatable about an axis of rotation 14 within a headstock 15.

The generating or roll cradle 6 is fixed to a base or pedestal 16, whereas the headstock 15 is displaceably mounted upon such base 16, and specifically in such a manner that there can be adjusted an angle of inclination β, which is shown here as an obtuse angle, between the generating or roll axis 4 and the axis of rotation 14. The second spindle 13 is adjustable vertically within the headstock 15 with respect to the plane of the base or pedestal 16.

In FIG. 2 there will be again recognized the gear pair 1 composed of the mating gear 3 which is just in the process of being manufactured and the gear 2 which here has been shown in broken or phantom lines, because it is only imaginary, in other words not really arranged at the generating axis 4. If such gear were really present, then the gear 2 in this position would mesh with the finished fabricated mating gear 3. A generatrix 22' is common to the pitch surfaces of the gear 2 and the mating gear 3. The mating gear 3 is secured to the spindle 7 and is connected by means of the pivotable part or element 8 with the generating or roll drum 5. The machining axis 9, just as was the case for the arrangement of FIG. 1, is inclined with respect to the generating or roll axis 4 through the same angle of inclination α. Analogous to FIG. 1 here also the face-mill cutter head 10 is rotatably mounted in the headstock 15 upon the second spindle 13 for rotation about the axis of rotation 14. Reference character 10' designates the position of the face-mill cutter head 10 prior to its plunge-cut at the mating gear 3.

FIG. 3 again illustrates the gear pair 1 which consists of the gear 2 and the imaginary mating gear 3. The gear 2 is secured to a spindle 13a, which here now constitutes the first spindle, and is mounted in a headstock 15a to be rotatable about the machining axis 9.

The face-mill cutter head 10 is affixed to a spindle 32, which here constitutes the second spindle, and is mounted to be rotatable about the axis of rotation 14 by means of a pivotable part or element 17 within a spindle housing 18. This spindle housing 18 is arranged upon the generating or roll drum 5. Also in this case the machining axis 9 is inclined with the same angle of inclination α with respect to the generating drum axis 4, and the axis of rotation 14 is inclined with the same angle of inclination β with respect to the generating axis 4.

Figure 3:
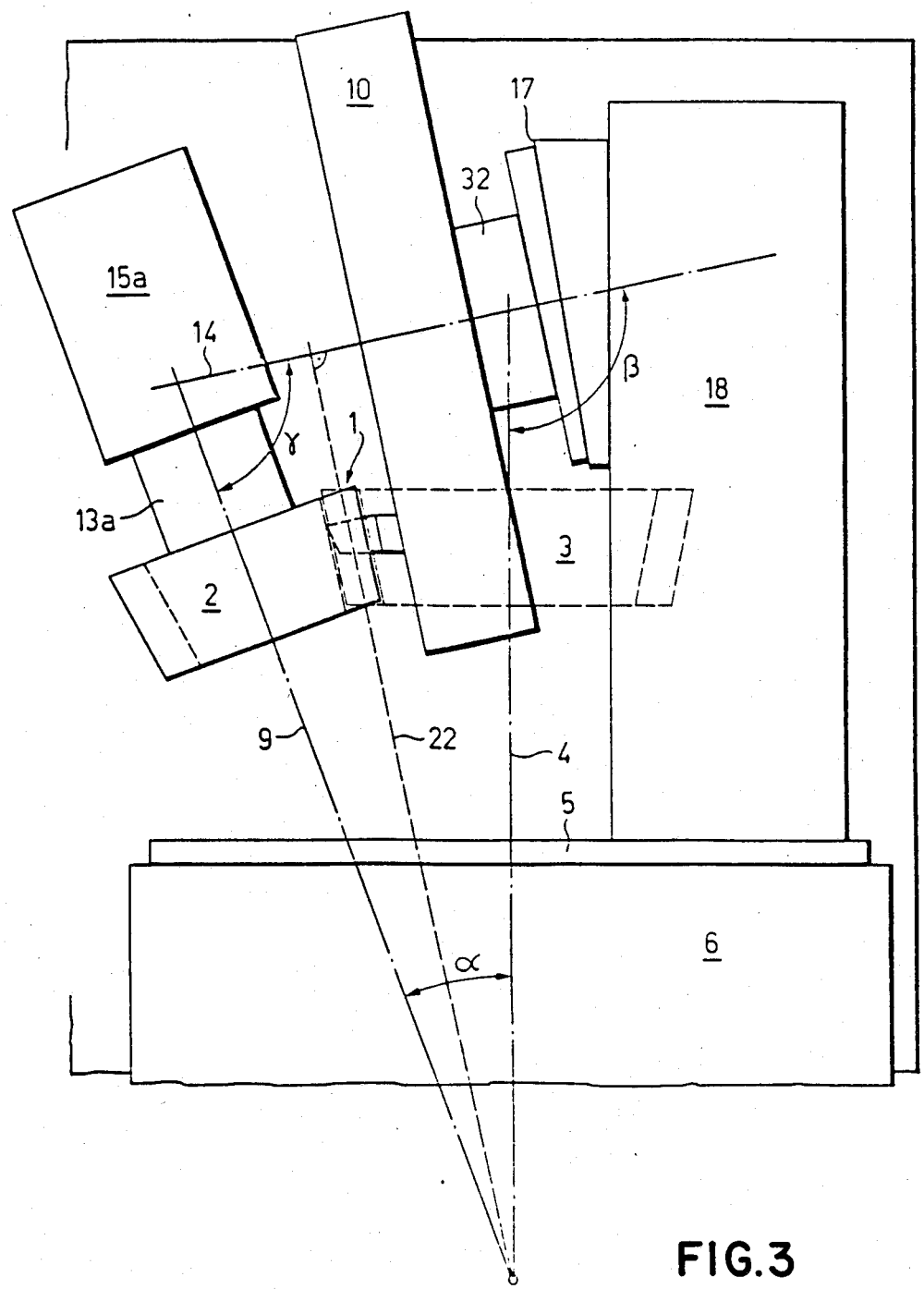
FIG. 3 illustrates a further arrangement analogous to FIG. 1.
Figure 4:
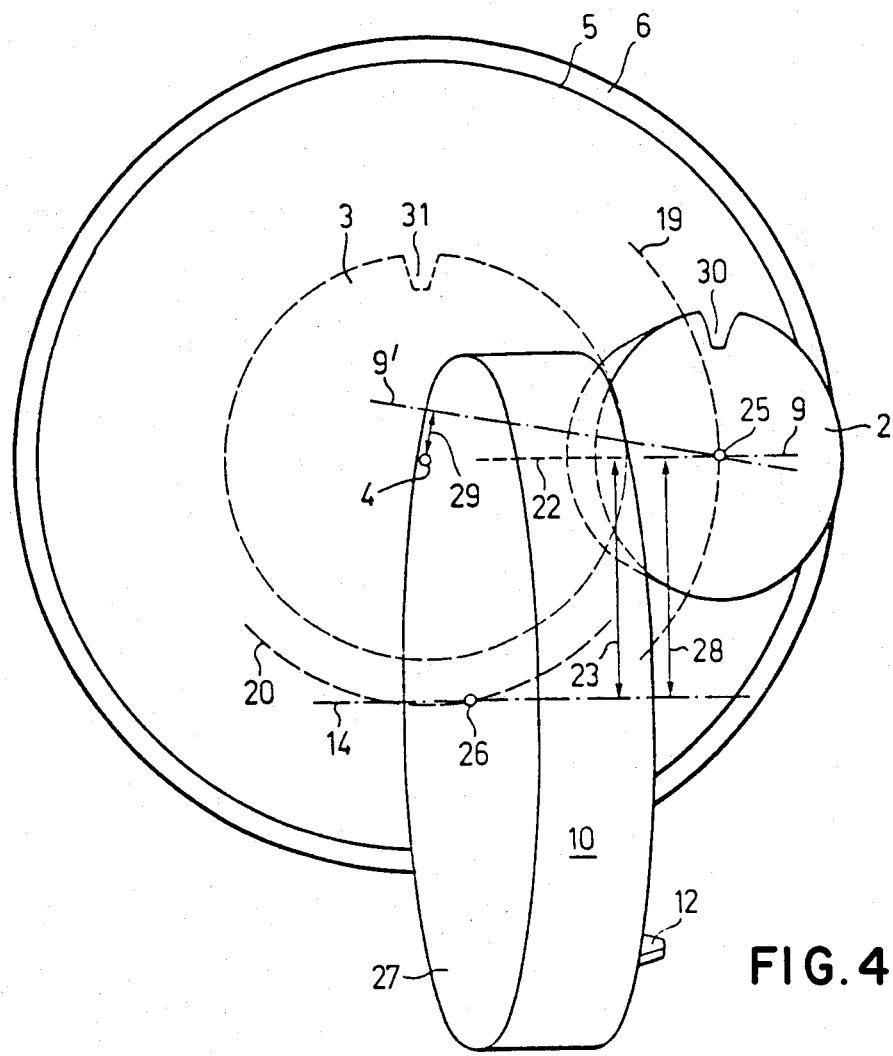
FIG. 4 is a front view of the arrangement according to FIGS. 1 and 3 for fabricating a pair of bevel gears.

FIG. 4 schematically illustrates the arrangement of gear 2, mating gear 3 and face-mill cutter head 10, as is known from the previous discussion of the arrangements discussed with respect to FIGS. 1 and 3, the illustration being in front view. The generating drum 5, as already known in this technology, is mounted to be rotatable about the generating axis 4 within the generating cradle 6. A point of intersection 25 of the end surface of the gear 2 with the machining axis 9, with the arrangement of FIG. 1, is pivotable about the generating axis 4 along an arc 19, whereas with the arrangement of FIG. 3, for instance an intersection point 26 of the rear side or face 27 of the face-mill cutter head 10 with the axis of rotation 14 is pivotable about the generating axis 4 along an arc 20. The cutter or cutter blade 12 engages, as shown in FIGS. 1 and 4, in tooth slots or spaces 30 of the gear 2. These tooth spaces 30 are located opposite straight flank spaces 31 of the mating gear 3.

If, instead of the gear pair 1 being a pair of bevel gears, such gear pair 1 be constituted by a pair of hypoid gears or gears whose shafts or axes are offset, then the gear 2 is for instance coaxially arranged with respect to a machining axis 9' which intersects the generating or roll axis 4 at a shortest distance 29.

Having now had the benefit of the foregoing discussion there will be described the inventive method for fabricating bevel and hypoid gear pairs.

In order to produce a gear pair 1 according to the inventive method with an arrangement of the type shown in FIG. 1, the gear 2 which is to be fabricated is arranged upon the generating or roll drum 5 and the face-mill cutter head 10 upon the headstock 15 and the following operations are undertaken: after the gear 2 has been mounted upon the first spindle 7 and the face-mill cutter head 10 upon the second spindle 13, the machining axis 9 and the rotational axis 14 must be adjusted. The machining axis 9 is adjusted with respect to the generating axis 4, by inclining the first spindle 7 by means of the pivotal or pivotable part 8, in a manner such that the angle of inclination α and the position of an intersection point 21, in the case of bevel gears, or the shortest axial distance 29 (FIG. 4), in the case of hypoid gears having offset axes, coincides exactly with the corresponding magnitudes of the axes of the gears of the gear pair 1.

The rotational axis 14 of the face-mill cutter head 10 is positioned perpendicular to the generatrix 22 (FIG. 1), which is common to the pitch surfaces of the gear 2 as well as of the mating gear 3. The perpendicular distance or spacing 23 (FIG. 4) between this generatrix 22 likewise shown in FIG. 4 and the rotational axis 14, as well as the spacing or distance 24 (FIG. 1) between the rotational axis 14 and the gear pair 1 is dependent in conventional manner upon the not further illustrated spiral angle of the teeth of the gear 2.

To generate the teeth of the one gear of the gear pair 1, for instance of the gear 2 (FIG. 1), the generating drum 5 is rotated about the generating axis 4. The intersection point 25 (FIG. 4) of the end surface of the gear 2 with the machining axis 9 thus leads to a movement along the arc 19. Other points of the machining axis carry out corresponding movements along different arcs which however all are concentric.

In order to produce the mating gear 3 (FIG. 2), such is chucked upon the first spindle 7, which can remain in the same position with respect to the generating or roll axis 4. On the other hand, the axis of rotation 14 of the face-mill cutter head 10 must be newly adjusted or set, and specifically, perpendicular to the new generatrix 22'. Since the gear 2 is now provided as an imaginary mating gear coaxially with respect to the generating axis 4, this generatrix 22', which is common to the pitch surfaces of both gears 2 and 3, is different than during the fabrication of the gear 2, provided that the gear 2 and the mating gear 3 are not of the same size.

The remaining settings are accomplished just as during fabrication of the gear 2, with the difference that the teeth of the mating gear 3 need not be rolled or generated.

For plunge-cutting, the face-mill cutter head 10' (FIG. 2) is axially shifted towards the gear 3. Depending upon the design of the machine, this is accomplished in that the headstock 15 is displaced upon the base or pedestal 16 in the direction of the axis of rotation 14, or in that with stationary headstock 15 the second spindle 13 carries out a stroke or displacement motion. This is accomplished in conventional manner while the face-mill cutter head 10 rotates about its axis of rotation 14.

In order to produce a gear pair 1 with the aid of an arrangement of the type shown in FIG. 3, i.e. the gear 2 to be fabricated is arranged upon the headstock 15a and the face-mill cutter head 10 is arranged upon the generating drum 5, the following procedures are carried out: if initially the gear 2 is to be fabricated, then a suitable blank is chucked upon the first spindle 13a. The face-mill cutter head 10 is chucked upon the second spindle 32. Thereafter, the machining axis 9 is set by inclining the spindle 13a and the axis of rotation 14 is set or adjusted by inclining the spindle 32, as has been already described for the arrangement of FIGS. 1 and 2.

The plunge-cut is accomplished in corresponding manner either by a stroke or displacement movement of the spindle 32 or by shifting the headstock 15a in the direction of the axis of rotation 14. The displacement of the headstock 15a, however, requires that the machining axis 9 first be parallelly displaced into a not particularly illustrated starting position, so that the axial spacing of the tooth depth is somewhat exceeded. For plunge-cutting the machining axis 9 is then displaced into the position shown in FIG. 2.

In order to generate the teeth, for instance of the gear 2, the generating drum 5 is rotated about its generating or rolling axis 4. The intersection point 26 (FIG. 4) of the rotational axis 14 of the face-mill cutter head 10 with its rear face or side 27 thus leads to a movement along the arc 20. In corresponding manner other points of the rotational axis 14 carry out movements during the generating motion, along other arcs which are concentric to the arc 20.

In order to cut lengthwise crowned teeth there are carried out the procedures which have already been described in the U.S. Pat. No. 4,183,703 to which reference may be readily had and the disclosure of which is incorporated herein by reference. A spacing 28, shown in FIG. 4, between the machining axis 9 of the gear 2 to be fabricated and the axis of rotation 14 of the face-mill cutter head 10 as well as an angle γ (FIGS. 1, 2, 3) between the machining axis 9 and the rotational axis 14 are altered by a respective amount. These amounts depend upon the degree of the desired tooth crown as is well known in this technology.

In order to produce hypoid gears whose axes are offset there are accomplished the same operations as during the fabrication of pairs of bevel gears. The machining axis 9' of the not particularly illustrated gear which is to be fabricated then no longer intersects the generating axis 4, rather such crosses it at the smallest spacing 29. In corresponding different manner there also extends the common generatrix.

As previously mentioned, the mating gear 3 can also be fabricated according to other plunge-cut methods upon known machinery, taking into consideration the desired supplementary requirements such as spiral angle, crowning, and so forth.

Figure 2:
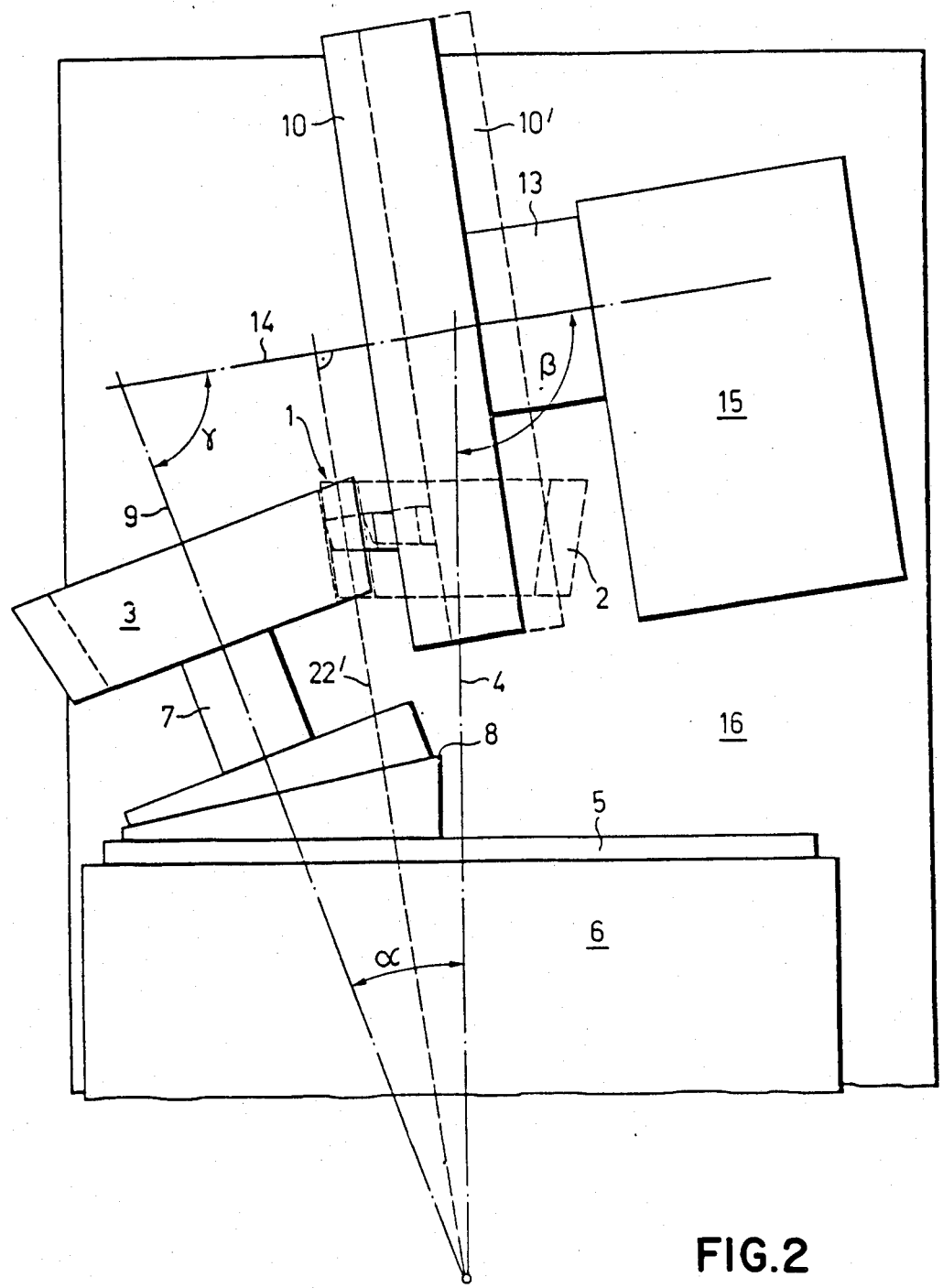
FIG. 2 schematically illustrates an arrangement for fabricating the mating gear of a pair of bevel or hypoid gears.

The maximum permissible cone or pitch angle for a bevel gear pair according to the method of the invention and using a machine corresponding to FIGS. 1 and 2 results from the maximum tilt angle of the first spindle 7, respectively from the maximum inclination angle, i.e. about 30° to 40°. When using a machine corresponding to FIG. 3, the maximum shaft angle of the gear pair results from the addition of the maximum tilt angle of the second spindle 32, which corresponds to the cone or pitch angle of the non-generated gear 3, with the cone or pitch angle of the gear 2 to be generated, i.e. for instance 40°+25°=65°.

When using a machine corresponding to FIGS. 1 and 2 which would have a tilt angle of from 0° to about 55°, the hitherto existing gap in the range of fabricatable cone or pitch angles for bevel gear pairs between 40° and about 60° can be bridged.

Furthermore, it is also conceivable to design machines or modify existing machines upon which the single indexing method is carried out such that the method according to the invention can also be carried out thereupon, e.g. by arranging the indexing device to act upon the first spindle and the cutter-head drive to act upon the second spindle.

While there are shown and described present preferred embodiments of the invention, it is to be distinctly understood that the invention is not limited thereto, but may be otherwise variously embodied and practiced within the scope of the following claims. Accordingly,

What I claim is:

1. A method of manufacturing bevel and hypoid gear pairs, comprising one gear having a longitudinal axis and a mating gear having a longitudinal axis wherein a finished gear pair has a small cone angle, by cutting-out tooth spaces with a face-mill cutter head which rotates about an axis of rotation, comprising the steps of:

clamping a first gear blank for the one gear of a gear pair upon a first spindle arranged upon a pivotable part arranged at a generating drum which is rotatable about a generating axis and wherein said pivotable part is pivotable out of a position parallel to said generating axis;

clamping the face-mill cutter head upon a second spindle arranged upon a headstock;

setting the first spindle upon a machining axis for manufacturing the one gear of the gear pair such that said longitudinal axis of the one gear coincides with said machining axis, the machining axis being inclined at an acute angle with respect to the generating axis and wherein a relative position of the machining axis and the generating axis to one another is essentially the same as that of said longitudinal axes of the one gear and the mating gear of the finished gear pair when the finished gear pair is in mesh;

setting the second spindle such that the axis of rotation of the face-mill cutter head is disposed approximately perpendicularly to a generatrix which is common to a pitch surface of the one gear to be fabricated and to a pitch surface of the mating gear imaginarily arranged coaxially with respect to the generating axis and further setting the second spindle such that the axis of rotation of the face-mill cutter head is disposed at a distance to the generatrix in accordance with a desired spiral angle of the one gear;

performing a generating movement about the generating axis with the first spindle for producing the one gear, so that tooth spaces are cut-out by the face-mill cutter head;

removing the one gear from the first spindle; and fabricating the mating gear of the gear pair with a desired spiral angle by performing a plunge-cut operation only.

2. The method as defined in claim 1, further including the steps of fabricating the mating gear of the gear pair by:

clamping a second gear blank for the mating gear of the gear pair upon the first spindle essentially coaxially with respect to the machining axis, wherein the first spindle remains in the same position as for the fabrication of the one gear of the gear pair;

setting the second spindle such that the axis of rotation of the face-mill cutter head is disposed approximately perpendicular to a further generatrix and at a distance to said further generatrix in accordance with the desired spiral angle of the mating gear, wherein the further generatrix is common to the pitch surface of the mating gear to be produced and to the pitch surface of the one gear serving as a counter-gear imaginarily arranged coaxially with respect to the generating axis;

performing a plunge-cut movement of the mating gear and the face-mill cutter head relative to one another in a direction perpendicular to the further generatrix without any generating movement while still maintaining the first spindle in the same position as for the fabrication of the one gear of the gear pair; and removing the mating gear formed from the second gear blank from the first spindle.

3. The method as defined in claim 1, wherein the teeth of the one gear and of the mating gear are crown cut to produce a tooth crown, further including the step of:

altering a spacing between the axis of the one gear or mating gear to be fabricated and the axis of rotation of the face-mill cutter head as well as an angle between the axis of the one gear or mating gear to be fabricated and the axis of rotation by an amount needed for attaining the tooth crown.

4. The method as defined in claim 1, wherein:

a shaft angle between the longitudinal axes of the one gear and the mating gear of the gear pair has a value less than 55°.

5. A method of manufacturing bevel and hypoid gear pairs having small cone angles by cutting-out tooth spaces with a face-mill cutter head which rotates about an axis of rotation, comprising the steps of:

producing one gear of a gear pair by mounting a first gear blank upon a first spindle carried by a generating drum rotatable about a generating axis and performing a generating movement of said first gear blank about the generating axis and producing a mating gear of the gear pair by performing a plunge-cut movement only;

a longitudinal axis of the one gear and the generating axis intersecting at an acute angle in a plane which is substantially parallel to the longitudinal axis of the one gear to be fabricated and to the generating axis; and the generating axis during the generating movement essentially assuming with respect to the longitudinal axis of the one gear to be produced the position of a longitudinal axis of the mating gear of the gear pair in mesh.

6. The method as defined in claim 5, wherein:
a shaft angle between the longitudinal axes of the one gear and the mating gear of the gear pair has a value less than 55°.

7. A method of manufacturing bevel and hypoid gear pairs, comprising one gear having a longitudinal axis and a mating gear having a longitudinal axis wherein a finished gear pair has a small cone angle, by cutting-out tooth spaces with a face-mill cutter head which rotates about an axis of rotation, comprising the steps of:

clamping a first gear blank for one gear of a gear pair upon a first spindle arranged upon a headstock;

clamping the face-mill cutter head upon a second spindle arranged upon a pivotable part which extends transversely from a front side of a spindle housing which is arranged parallel to a generating axis upon a generating drum and wherein said pivotable part is pivotable out of a position perpendicular to the generating axis;

setting the first spindle upon a machining axis for manufacturing the one gear of the gear pair such that the longitudinal axis of the one gear conincides with said machining axis, the machining axis being inclined at an acute angle with respect to the generating axis and wherein a relative position of the machining axis and the generating axis to one another is essentially the same as that of the longitudinal axes of the one gear and the mating gear of the gear pair when the gear pair is in mesh;

setting the second spindle such that the axis of rotation of the face-mill cutter head is disposed approximately perpendicular to a generatrix which is common to a pitch surface of the one gear to be fabricated and to a pitch surface of a mating gear imaginarily arranged coaxially with respect to the generating axis and further setting the second spindle such that the axis of rotation of the face-mill cutter head is disposed at a distance to the generatrix in accordance with a desired spiral angle of the one gear;

performing a generating movement about the generating axis with the second spindle for producing the one gear, so that tooth spaces are cut-out by the face-mill cutter head;

removing the one gear from the first spindle; and fabricating the mating gear of the gear pair with a desired spiral angle by performing a plunge-cut operation only.

8. The method as defined in claim 7, further including the steps of fabricating the mating gear of the gear pair by:

clamping a second gear blank for the mating gear of the gear pair upon the first spindle essentially coaxially with respect to the machining axis, wherein the first spindle remains in the same position as for the fabrication of the one gear of the gear pair;

setting the second spindle such that the axis of rotation of the face-mill cutter head is disposed approximately perpendicular to a further generatrix and at a distance to said further generatrix in accordance with the desired spiral angle of the mating gear, wherein the further generatrix is common to the pitch surface of the mating gear to be produced and to the pitch surface of the one gear serving as a counter-gear imaginarily arranged coaxially with respect to the generating axis;

performing a plunge-cut movement of the mating gear and the face-mill cutter head relative to one another in a direction perpendicular to the further generatrix without any generating movement while still maintaining the first spindle in the same position as for the fabrication of the one gear of the gear pair; and removing the mating gear formed from the second gear blank from the first spindle.

9. The method as defined in claim 7, wherein:
a shaft angle of the one gear and the mating gear of the gear pair has a value less than 65°.

* * * * *